United States Patent [19]

Gennari et al.

[11] Patent Number: 5,387,260

[45] Date of Patent: Feb. 7, 1995

[54] HANDLING-SWITCHING MACHINE WITH DEVICE FOR KEEPING CONVEYOR TABLES IN A HORIZONTAL POSITION

[75] Inventors: Nedo Gennari; Andrea Faure, both of Genoa, Italy

[73] Assignee: Finmeccanica S.p.A., Rome, Italy

[21] Appl. No.: 181,336

[22] Filed: Jan. 18, 1994

[30] Foreign Application Priority Data

Feb. 19, 1993 [IT] Italy .................. MI93 A 000308

[51] Int. Cl.⁶ ........................................... B65G 17/18
[52] U.S. Cl. ........................................ 198/798; 198/800
[58] Field of Search ............... 198/797, 798, 799, 800, 198/475.1, 365

[56] References Cited

U.S. PATENT DOCUMENTS

| | | | |
|---|---|---|---|
| 3,202,115 | 8/1965 | Jones, Jr. ...................... 198/798 X |
| 3,297,139 | 1/1967 | Speigle ........................... 198/800 |
| 3,405,795 | 10/1968 | Mascherpa .................... 198/800 X |
| 3,447,666 | 6/1969 | Nero-Hacoben ............... 198/800 |
| 4,067,437 | 1/1978 | Frantl et al. ................... 198/800 |
| 4,346,803 | 8/1982 | Haessler et al. .............. 198/800 X |
| 4,378,873 | 4/1983 | Cloudy .......................... 198/800 X |
| 4,938,335 | 7/1990 | Canziani ....................... 198/365 |

FOREIGN PATENT DOCUMENTS 262368 12/1926 United Kingdom ............... 198/798

Primary Examiner—H. Grant Skaggs
Assistant Examiner—Carol L. Bruzbick
Attorney, Agent, or Firm—Notaro & Michalos

[57] ABSTRACT

This invention proposes a handling-switching apparatus in which the pieces to be handled are placed on conveyor tables constituted by rotating carpets that are inclined and set to rotation to unload the conveyed piece. The path, loop shaped, develops on a vertical plane and a characteristic of the invention is that means to keep in the horizontal position the carpets even in the sections connecting the upper to the lower part of the path and conversely are provided.

4 Claims, 4 Drawing Sheets

HANDLING-SWITCHING MACHINE WITH DEVICE FOR KEEPING CONVEYOR TABLES IN A HORIZONTAL POSITION

FIELD AND BACKGROUND OF THE INVENTION

This invention proposes a handling-switching apparatus comprising a number of conveyor tables, each constituted by a rotating carpet on which the piece to be handled is placed and that is dragged along a loop path developing on a vertical plane.

A characteristic of the invention is that means suitable to keep in the horizontal position even in that part of their path that connects the upper to the lower section of the path, are provided. Handling-switching apparatuses in which the pieces to be handled are placed on a carriage fitted with a rotating carpet that constitutes the conveyor table and that is dragged along a fixed path, specifically a loop path developing on a vertical plane, are known.

In some of such apparatuses unloading takes place by tilting the carriage and setting the carpet to rotation, to unload the piece towards underlying collecting devices.

One of such apparatuses is known through the Italian Patent Application MI A 2213 dated Jun. 8, 1991 of the same applicant.

In such handling-switching apparatuses carriages with carpets are dragged by a pair of belts or chains, that are driven by gearwheels provided at both ends of the apparatus.

The path includes then two sections, an upper and a lower one, said sections being essentially rectilinear and connected by two semicircular sections.

The pieces are introduced into the machine in correspondence with loading areas provided at the apparatus head ends and are unloaded when they come to pass in correspondence with some collecting devices suitably predisposed, associated with that piece in a known way by means of a coding operation at the moment of loading.

In known apparatuses the carriages, passing from the upper to the lower section of their path or conversely, perform a 180° rotation, thereby overturning.

Owing to this reason, it is necessary that the pieces be unloaded before the carriage reaches the end of the rectilinear section of its path, and this constitutes a remarkable operating limitation.

SUMMARY OF THE INVENTION

To make up for this inconvenience, this invention proposes a handling-switching apparatus as hereinbefore described, that is however characterized by the presence of means suitable the carriages to keep in the horizontal position even when they run through the section connecting the upper to the lower part of the path, or conversely.

In greater detail, these means are constituted by a number of shafts mounted in such a way that only allows them to rotate on the wheels which drive the carriage dragging chains.

Each shaft is provided with a pair of gearwheels that engage respectively with a fixed gearwheel that is coaxially arranged with the shaft of the wheels that drive said chains and with a gearwheel integrally connected with the carriage frame axle.

By properly selecting the ratios between the teeth of such wheels it is possible to compensate for the rotation of carriages, thereby keeping them perfectly horizontal.

BRIEF DESCRIPTION OF THE DRAWINGS

This invention will now be described in detail, as a non-limiting example, referring to the attached figures, where.

DESCRIPTION OF THE PREFERRED EMBODIMENT

Figure 1:
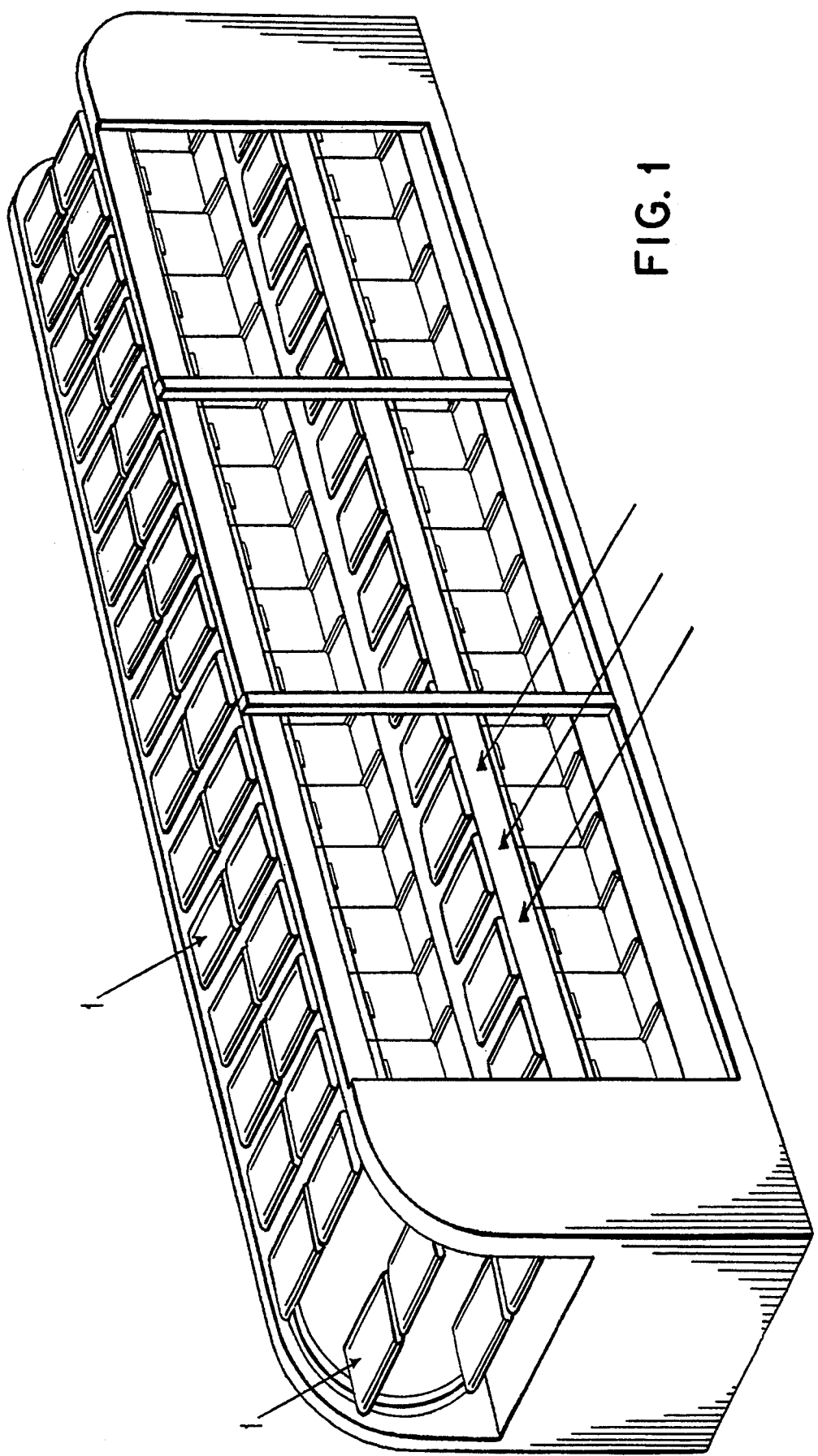
FIG. 1 is a perspective view of the apparatus according to the invention.
Figure 2:
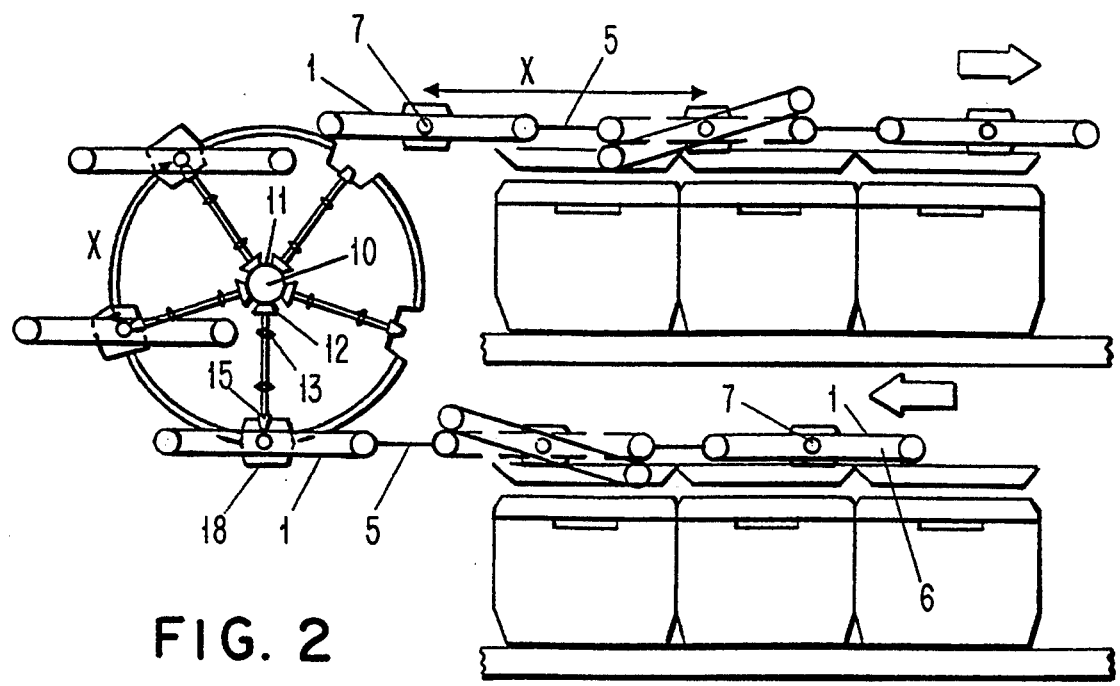
FIG. 2 is the schematic side view of a head end of the apparatis according to the invention.

With reference to FIG. 1, the apparatus according to the invention includes a number of conveyor tables, indicated by numeral 1, each constituted by a rotating carpet or conveyor belt mounted on a carriage and dragged along a loop-shaped path developing on a vertical plane.

The path includes an upper and a lower section, both of which are substantially horizontal, connected by two circle-arc sections, at the machine head ends.

All the machine operations are managed, in a known way, by a central computer that assigns a given carriage to each piece, when the latter is loaded onto the machine, and controls its unloading when the carriage comes to pass in correspondence with the collecting device provided for.

Figure 4:
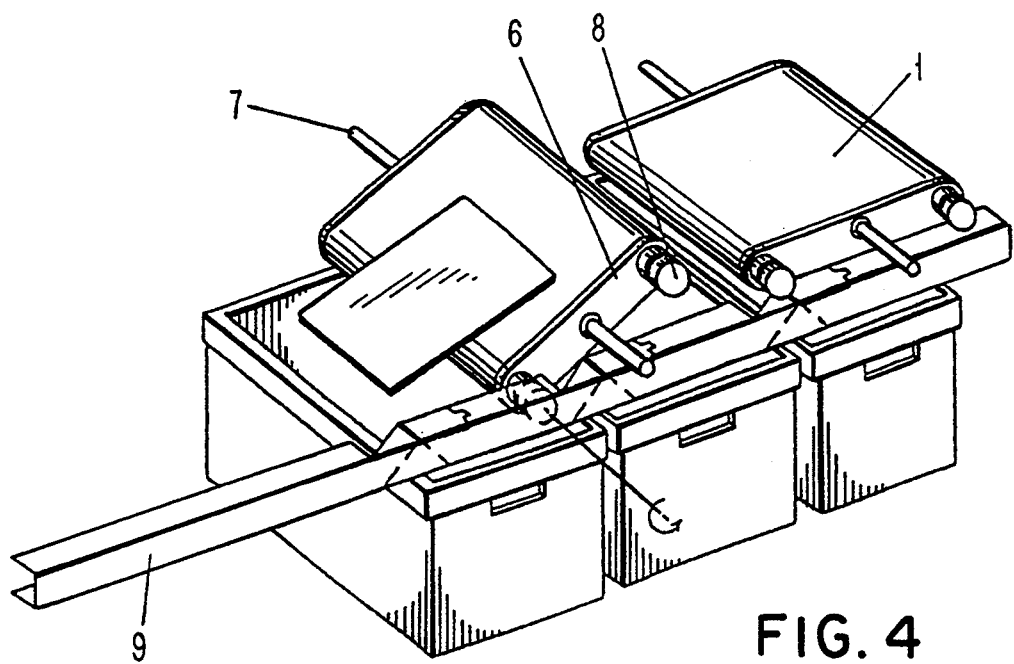
FIG. 4 shows a carpet during the conveyed piece unloading step.

Such collecting devices are preferably placed below the carriage path and unloading takes place by inclining the carpet and setting it to rotation to cause the piece to fall into the underlying collecting device, as shown in FIG. 4.

The carpets move in a substantially horizontal position or all inclined, to later recover the horizontal position at the end of every rectilinear path, while the carriages by means of wheels or the like lean on side rails placed in correspondence with the upper and lower sections of the path, and the problem the invention aims at solving is keeping such carpets in the horizontal position along the sections connecting the upper rectilinear path to the lower one and conversely.

Figure 5:
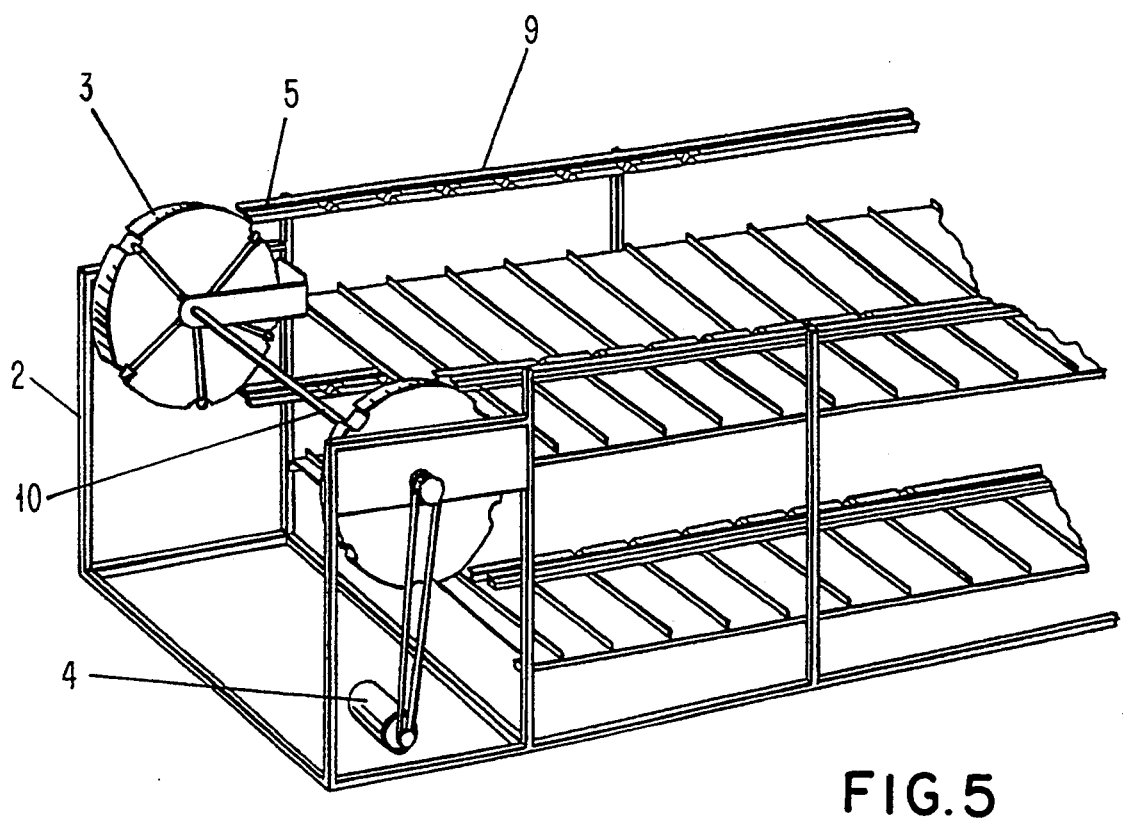
FIG. 5 is a schematic perspective view of the dragging devices in a machine according to the invention.
Figure 6:
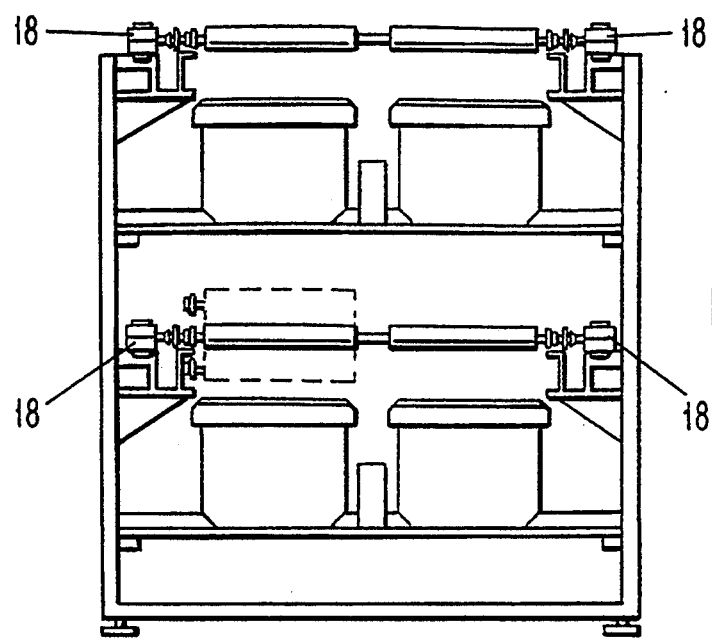
FIG. 6 is a schematic vertical section of the handling-switching apparatus.

The machine (see FIG. 5) includes a frame 2 on which a pair of driving wheels 3 are mounted, that are operated by an electric motor 4 or the like and that drag as many belts or chains 5.

Carpets 1 are mounted on a frame or carriage 6 fitted with a shaft 7, which shaft is connected to belts 5. Wheels 3, then, through belts 5 drag carriages 6 along the path.

Every carriage is provided with wheels 8 or the like that lean on rails 9 placed along the horizontal sections of the path, thus keeping the carriage in its plane.

The wheels 3 are connected by a shaft 10.

Figure 3:
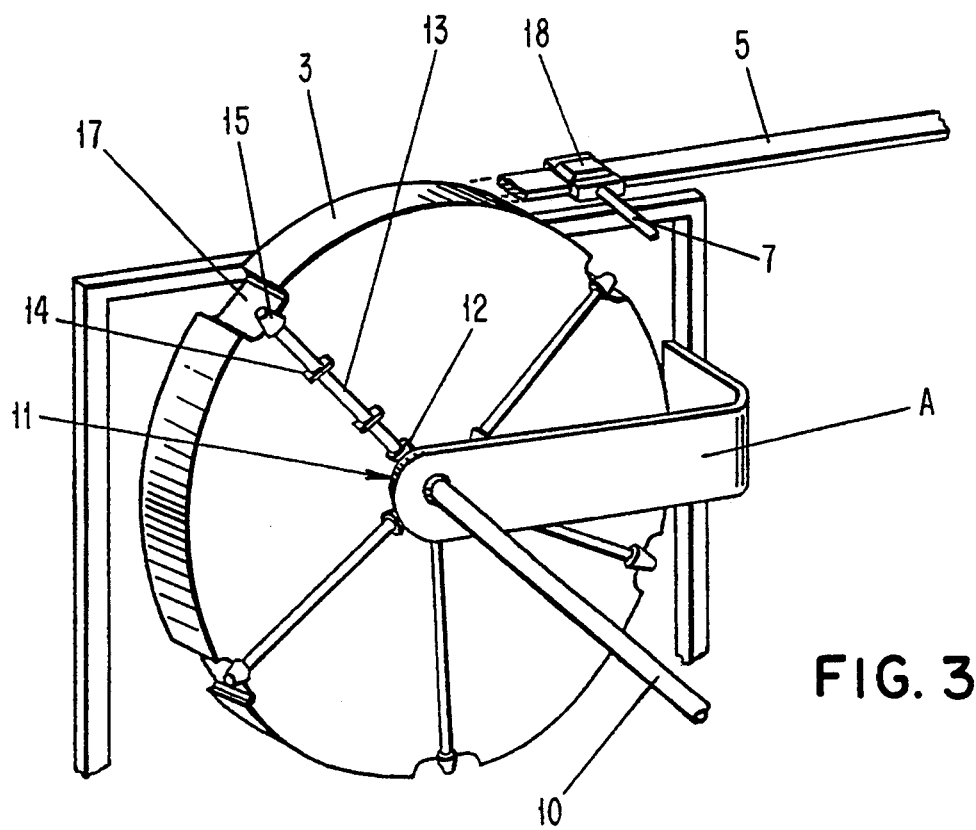
FIG. 3 is a perspective view of the machine driving wheels.

A bevel gear 11, which is coaxial with shaft 10, is fixedly mounted on a support A shown in FIG. 3.

Gear 11 engages a series of bevel gears 12, each one of which is keyed on a shaft 13 that is in turn mounted in a radial position on wheel 3 by means of bearings 14. Shafts 13 are consequently dragged by wheel 3 with respect to which, however, they can freely rotate on their axle.

Figure 7:
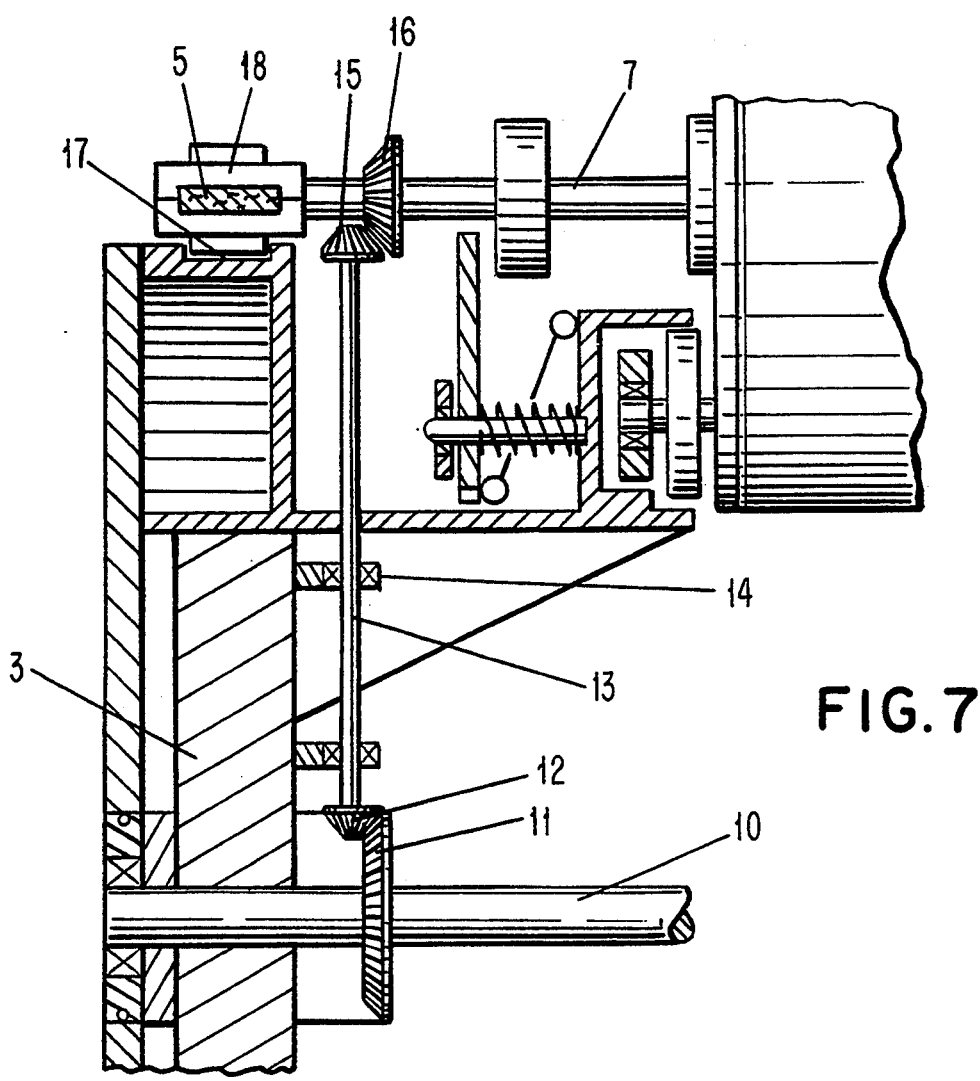
FIG. 7 shows a detail of FIG. 6.

At the opposed end of each one of shafts 13 there is another bevel gear 15 which, when the carriages arrive in correspondence with wheels 3, engages the teeth of a corresponding gear 16 keyed on shaft 7 of the carriages (FIG. 7).

Specifically (see FIG. 3) wheels 3 exhibit, on their perimeter, a number of notches 17 inside of which blocks 18 or the like, fixed to belts 5, are inserted.

The shafts 7 of carriages 6 are connected to such blocks 18, while shafts 13 are mounted on wheels 3 in correspondence with notches 17.

During the machine movement, therefore, the shafts 13 follow wheels 3 and perform, consequently, a kind of revolution around fixed bevel gear 11.

This causes then, owing to the engagement of gears 11 and 12, the rotation of shafts 13 and gearwheels 15 on their axles.

This, by engaging gears 16 integrally connected with carriage shafts 7, sets to rotation such shafts.

By properly selecting the ratios between the toothings of bevel gears 11-12 and 15-16 it is then possible to provide for the rotation of shaft 7, during the passage of the carriage from one to another section of the path, to be equal to 180°.

By this way the carriage with rotating carpet 1 keeps perfectly horizontal during such movement.

A skilled person will then be able to plan many modifications and changes, that shall anyway be deemed to all be comprised within the scope of this invention.

We claim:

1. A handling-switching machine comprising:
   a frame having opposite ends;
   a pair of drive wheels mounted for rotation about a horizontal axis at each end of the frame;
   a first gear fixed to each drive wheel for rotation with each drive wheel;
   a pair of chains each engaged around one of the wheels at one end of the frame and one of the wheels at an opposite end of the frame, each chain forming a closed loop path having upper and lower horizontal sections and opposite ends;
   a plurality of carriages connected between said pair of chains and movable along said closed loop path, each carriage having a carpet movable thereon;
   a carriage shaft extending through and fixed to each carriage;
   a pair of second gear wheels fixed to opposite ends of each carriage shaft; and
   a plurality of radially extending shafts rotatably mounted to each drive wheel, each radially extending shaft having a third gear meshed with said first gear at one end of each radially extending shaft, and a fourth gear at an outer end of each radially extending shaft positioned to engage said second gear of each carriage shaft as each carriage shaft moves adjacent a pair of said drive wheels at one end of said frame, rotation of said drive wheels moving said carriages around an end of said closed loop path so that, with rotation of said first gears caused by rotation of said drive wheels, said radially extending shafts are rotated to cause rotation of said carriage shafts to maintain a horizontal position of each carriage as each carriage moves around each end of said closed loop path.

2. A machine according to claim 1, including a plurality of notches around each drive wheel, each notch being adjacent one of the fourth gears connected to said radially extending shafts, and a block fixed to opposite ends of each carriage shaft and engageable into each respective notch for facilitating movement of each carriage around the ends of each loop path.

3. A machine according to claim 2, wherein each of said gears is a bevel gear.

4. A machine according to claim 2, including two pairs of carriage wheels on each side of each carriage and a pair of rails extending along said upper and lower sections of said closed loop path on which said carriage wheels engage, said rails having openings for receiving carriage wheels of said carriages for allowing tilting of said carriages as said carriages move along said upper and lower sections of said closed loop path.

* * * * *